Dec. 30, 1930.  A. KÉGRESSE  1,786,539
METAL AND RUBBER TRACK BELT
Filed April 5, 1929  2 Sheets-Sheet 1
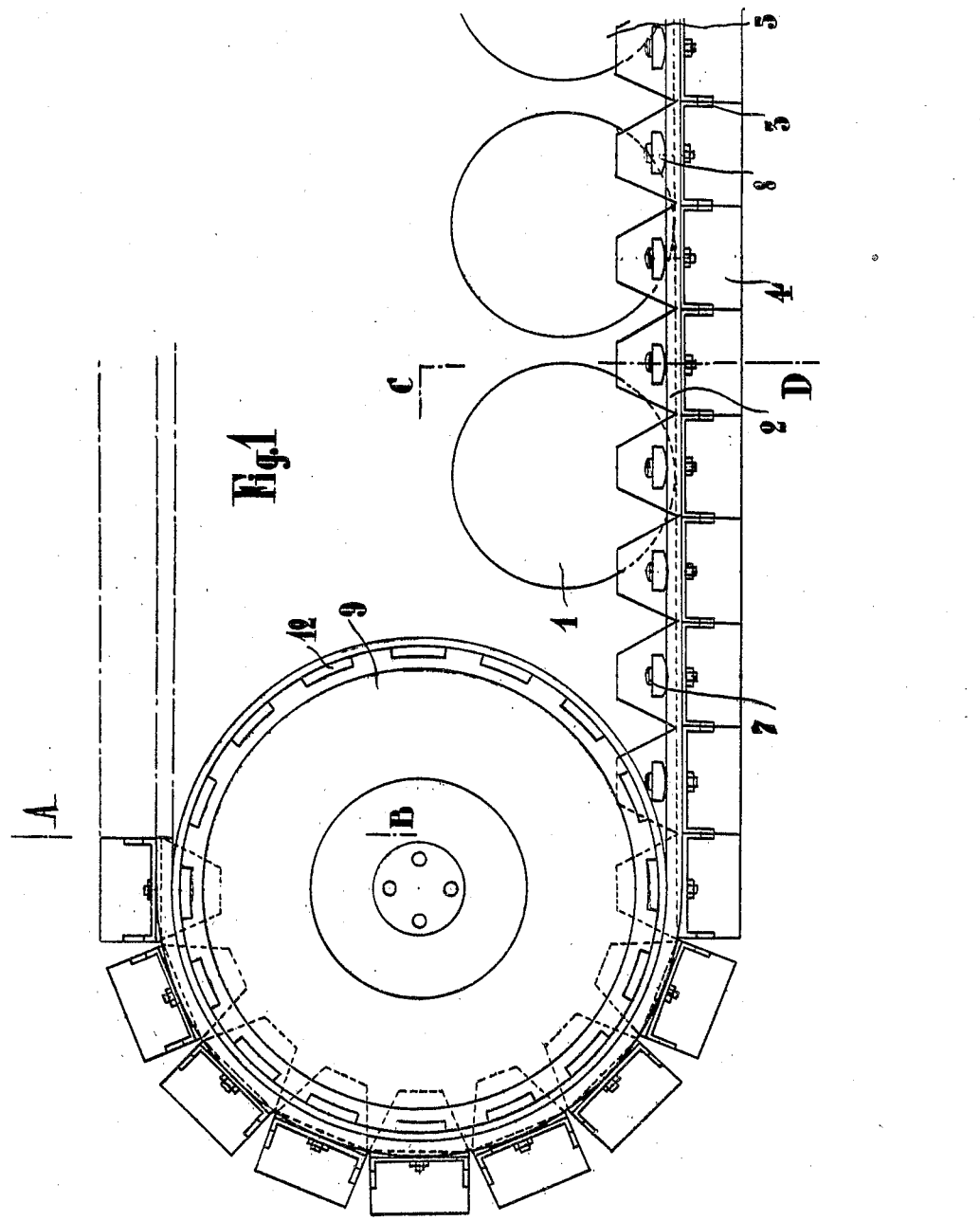
Inventor:
Adolphe Kégresse
By
Attorney Dec. 30, 1930.  A. KÉGRESSE  1,786,539
METAL AND RUBBER TRACK BELT
Filed April 5, 1929    2 Sheets-Sheet 2
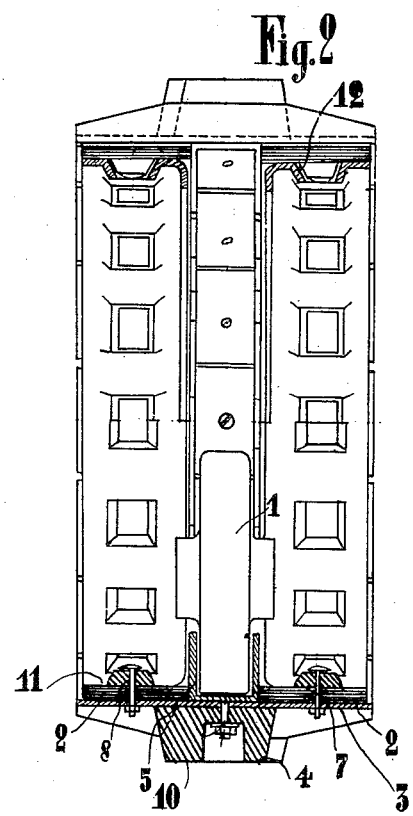
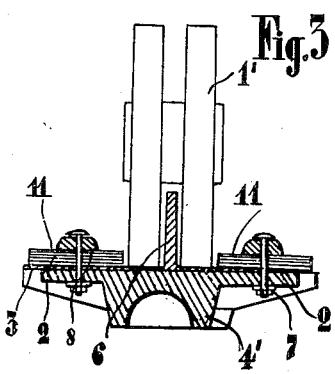
INVENTOR:
Adolphe Kégresse
BY
ATTORNEY Patented Dec. 30, 1930

1,786,539

UNITED STATES PATENT OFFICE

ADOLPHE KÉGRESSE, OF COURBEVOIE, FRANCE

METAL AND RUBBER TRACK BELT

Application filed April 5, 1929, Serial No. 352,709, and in France April 20, 1928.

In the known metal-and-rubber track belts, the endless band which forms the body of the belt and effects the traction, serves also as a track for the rollers, which latter, by rolling upon the band, damage the same.

This invention concerns a novel metal-and-rubber belt in which two endless strips form the body of the belt and provide for its traction without being subjected to the action of the rollers.

Two embodiments of the invention are shown by way of example in the appended drawings, in which Figure 1 is a side elevational view of one form or embodiment.

Figure 2 is a cross sectional view thereof, and Figure 3 is a cross sectional view of another form which is now deemed preferred.

1 designates the rollers in Figs. 1 and 2, and 1' the twin-roller in Fig. 3.

The belt, speaking generally, consists of two endless strips 2 providing for traction and arranged parallel with each other, a space being left free between them.

Arranged crosswise of the strips 2 and in nearly contacting relation with one another are plates 3 by which the strips are connected to each other and maintained in the desired spaced relation. These strips 2 are secured upon the plates 3 by means of bolts 7 which, at the same time, hold the positive driving prongs 8 in position upon the strips. The prong rows 8 occupy only part of the breadth of the endless strips 2; the surfaces which remain free (see Figures 2 and 3) serving as bearing surfaces for the pulleys by which the structure is supported. The driving pulley 9 (see Figure 1) is formed with recesses 12 (see Figs. 1 and 2) suited to prongs 8.

Arranged between the endless strips 2 are the guiding means which may consist of U-shaped members 5 cast integral with the plates or secured thereto, as shown in Figure 2, for instance by means of rivets or countersunk bolts 10.

In the form shown in Figure 3, however, the guiding means on each plate 3 consists of a single rib 6 either cast integral with the plate or secured thereto by known means.

Arranged upon the opposite face of plates 3 are the ground engaging blocks (see 4 in Figs. 1 and 2, and 4' in Fig. 3) which are made of a plastic material.

The track for the rollers is provided, in the case of Figure 2, by the inner faces of the U-shaped members 5. The dimension of the base of the U-shaped member lengthwise of the belt is equal to the width of the plates of the belt, as may be seen by reference to Figure 1.

In the form shown in Figure 3, the track for the twin-roller members on either side of the guiding rib 6 is provided by plates 3 themselves. On even ground, a smooth surface is thus formed over which the rollers may pass without any impact of one belt member upon the next one.

The guiding of the belt around the idle pulleys 1 is provided for, as shown in Figure 2, by the U-shaped members 5. In the case of Figure 3, the guiding of the pulleys 1' is afforded by the central ribs 6, as in the known track belts.

In the form shown in Figure 2, the endless strips 2 bear laterally against the side members of the U-shaped guides 5, whereby foreign matter is prevented from entering between the strips 2 and said guides 5. The effect of this is that the general structure of the belt is strengthened in that the plates are prevented from assuming diagonal positions.

As may be seen from the above description, the endless strips which effect the traction of the belt are not subjected to the destructive effects of the rollers and are thus capable of performing a much longer service than when the rollers run on them.

I claim as my invention:

1. An endless track belt for use in connection with a driving pulley provided with peripheral recesses, and a series of supporting rollers; said belt composed of a pair of endless strips arranged side by side in spaced, parallel relation; metal connecting plates arranged transversely of the belt in substantially contacting relation with one another along their longitudinal edges and fastened to the outer faces of said strips; a longitudinal row of driving projections arranged centrally on the inner face of each strip for reception in the recesses in the driving pulley; ground-engaging blocks connected to the outer faces of said metal plates; and bolts to connect the strips and rows of driving projections to the inner faces of said metal plates; and a longitudinal row of guide members for the supporting rollers secured between the two strips at the central portions of said connecting plates.

2. A track belt according to claim 1, in which the guide members for the supporting rollers each consists of a single rib rigidly secured to the connecting plates.

3. A track belt according to claim 1, in which each supporting roller comprises a pair of laterally-spaced members, and in which the guide members embody ribs secured to the connecting plates and arranged to pass freely through the spaces between the members of the rollers.

In testimony whereof I affix my signature.

ADOLPHE KÉGRESSE.